US010040646B2

(12) United States Patent
Yule et al.

(10) Patent No.: US 10,040,646 B2
(45) Date of Patent: Aug. 7, 2018

(54) T-BOLT FOR DOCK LIP

(71) Applicant: Blue Giant Equipment Corporation, Brampton (CA)

(72) Inventors: Robert Campbell Yule, Cambridge (CA); Paulo Jorge da Silva Cruz, Toronto (CA); William McEachern, Thornbury (CA)

(73) Assignee: Blue Giant Equipment Corporation, Mississauga, Ontario (CA)

( * ) Notice: Subject to any disclaimer, the term of this patent is extended or adjusted under 35 U.S.C. 154(b) by 0 days.

(21) Appl. No.: 15/827,359

(22) Filed: Nov. 30, 2017

(65) Prior Publication Data

US 2018/0079608 A1  Mar. 22, 2018

Related U.S. Application Data

(63) Continuation of application No. 15/260,922, filed on Sep. 9, 2016.

(60) Provisional application No. 62/217,062, filed on Sep. 11, 2015, provisional application No. 62/217,263, filed on Sep. 11, 2015.

(51) Int. Cl.
  *E01D 21/00*  (2006.01)
  *E01D 18/00*  (2006.01)
  *B65G 69/28*  (2006.01)

(52) U.S. Cl.
  CPC ........ *B65G 69/287* (2013.01); *B65G 69/2811* (2013.01); *E01D 18/00* (2013.01); *E01D 21/00* (2013.01)

(58) Field of Classification Search
  CPC ............ B65G 69/2841; B65G 69/2823; B65G 69/2817; B65G 69/287; B65G 69/2811; E01D 18/00; E01D 21/00
  See application file for complete search history.

(56) References Cited

U.S. PATENT DOCUMENTS

| 2,626,411 A | * | 1/1953 | Palmer | B65G 69/2858 14/71.7 |
| 3,106,826 A | * | 10/1963 | Freidel | E02B 3/068 14/69.5 |
| 3,117,332 A | * | 1/1964 | Kelley | B65G 69/2841 14/71.3 |
| 3,982,295 A | | 9/1976 | Burnham | |
| 4,010,505 A | * | 3/1977 | Bouman | B65G 69/2841 14/71.3 |
| 4,014,059 A | | 3/1977 | Artzberger et al. | |

(Continued)

FOREIGN PATENT DOCUMENTS

| DE | 202007002829 | 8/2007 |
| EP | 0458206 | 11/1991 |

(Continued)

*Primary Examiner* — Abigail A Risic
(74) *Attorney, Agent, or Firm* — Price Heneveld LLP

(57) ABSTRACT

A dock leveler includes a frame. A deck plate is rotationally coupled to the frame at a deck hinge. A lip plate defines a lip plate lower surface and an edge. A lip hinge is coupled to the lip plate and a connection plate to provide relative pivotal movement of the lip plate and the deck plate. The connection plate is positioned below the deck plate. A support link extends from the lip plate to the connection plate. The support link is rotationally operable with respect to the lip plate and slidably operable with respect to the connection plate.

19 Claims, 5 Drawing Sheets

(56) References Cited

U.S. PATENT DOCUMENTS

| | | | | |
|---|---|---|---|---|
| 4,081,874 | A | * | 4/1978 | Artzberger ......... B65G 69/2823 14/71.7 |
| 4,455,703 | A | * | 6/1984 | Fromme ............ B65G 69/2894 14/71.3 |
| 4,920,598 | A | * | 5/1990 | Hahn ................. B65G 69/2888 14/71.1 |
| 5,311,628 | A | * | 5/1994 | Springer ............ B65G 69/2823 14/71.1 |
| 5,446,938 | A | | 9/1995 | Warner et al. |
| 5,471,693 | A | | 12/1995 | Hodges |
| 5,481,774 | A | | 1/1996 | Hodges et al. |
| 5,522,107 | A | | 6/1996 | Hageman et al. |
| 5,546,623 | A | | 8/1996 | Hahn |
| 5,586,356 | A | * | 12/1996 | Alexander ......... B65G 69/2841 14/71.1 |
| 5,600,859 | A | | 2/1997 | Hodges et al. |
| 5,640,733 | A | | 6/1997 | Alten et al. |
| 5,651,155 | A | | 7/1997 | Hodges et al. |
| 5,802,650 | A | | 9/1998 | Massey et al. |
| 5,832,554 | A | | 11/1998 | Alexander |
| 6,125,491 | A | | 10/2000 | Alexander |
| 6,276,016 | B1 | | 8/2001 | Springer |
| 6,311,352 | B1 | * | 11/2001 | Springer ............ B65G 69/2823 14/69.5 |
| 6,360,393 | B1 | | 3/2002 | Fritz |
| 6,370,719 | B1 | | 4/2002 | Alexander |
| 6,460,212 | B2 | | 10/2002 | Massey et al. |
| 6,629,328 | B2 | * | 10/2003 | Widule ............... B65G 69/2823 14/69.5 |
| 6,760,944 | B2 | | 7/2004 | Hodges |
| 6,910,239 | B2 | | 6/2005 | Hodges |
| 7,047,584 | B2 | | 5/2006 | Hoofard et al. |
| 7,134,159 | B2 | | 11/2006 | Muhl et al. |
| 7,216,392 | B2 | | 5/2007 | Hoofard et al. |
| 7,409,739 | B2 | | 8/2008 | Whitley et al. |
| 7,603,733 | B2 | | 10/2009 | Laverman et al. |
| 7,926,140 | B2 | | 4/2011 | Whitley et al. |
| 7,996,943 | B2 | | 8/2011 | Wallis et al. |
| 8,046,857 | B2 | | 11/2011 | Whitley et al. |
| 2001/0039687 | A1 | * | 11/2001 | Hahn ................. B65G 69/2823 14/71.3 |
| 2003/0066144 | A1 | * | 4/2003 | Widule ............... B65G 69/2823 14/71.1 |
| 2005/0251933 | A1 | | 11/2005 | Mitchell et al. |
| 2006/0032004 | A1 | * | 2/2006 | Mitchell ............ B65G 69/2811 14/71.1 |
| 2006/0081756 | A1 | | 4/2006 | Hallett |
| 2007/0180633 | A1 | | 8/2007 | Whitley et al. |
| 2015/0128360 | A1 | | 5/2015 | Leum |

FOREIGN PATENT DOCUMENTS

| | | |
|---|---|---|
| EP | 2733097 | 5/2014 |
| EP | 2871145 | 5/2015 |

* cited by examiner

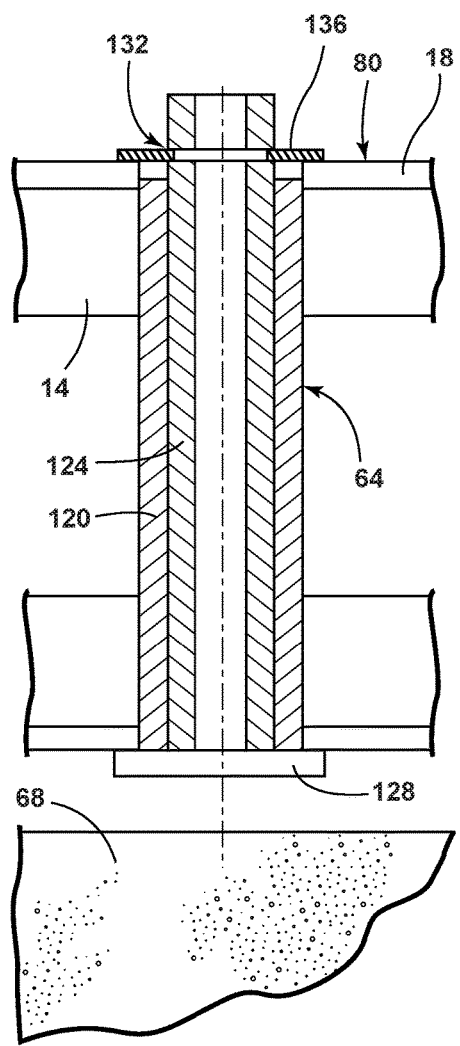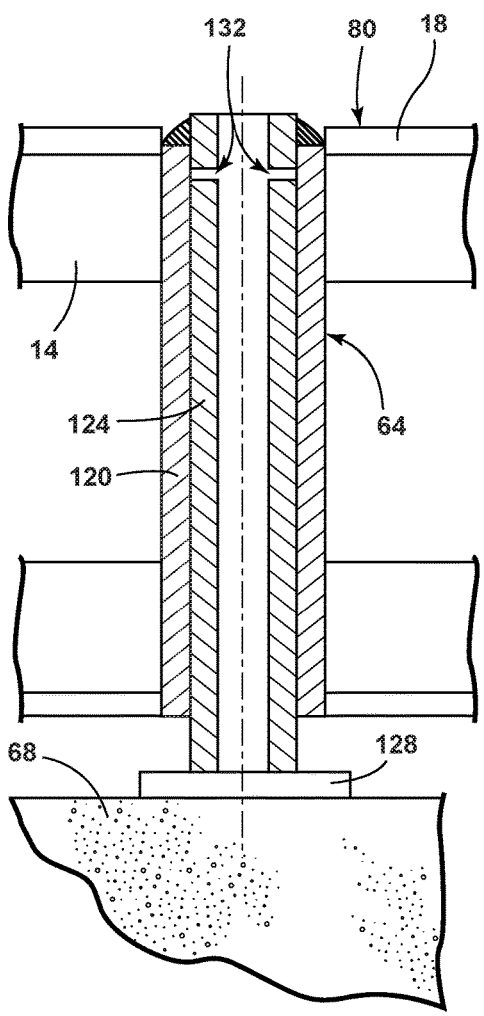
FIG. 7
FIG. 8

T-BOLT FOR DOCK LIP

CROSS-REFERENCE TO RELATED APPLICATION

The present application is a continuation of U.S. patent application Ser. No. 15/260,922 filed Sep. 9, 2016, entitled T-BOLT FOR DOCK LIP, which claims priority to and the benefit under 35 U.S.C. § 119(e) of U.S. Provisional Patent Application No. 62/217,062, filed on Sep. 11, 2015, entitled "DOCK LEVELER LIP CONSTRUCTION," and U.S. Provisional Patent Application No. 62/217,263, filed on Sep. 11, 2015, entitled "T-BOLT FOR DOCK LIP," the entire disclosures of which are hereby incorporated herein by reference.

BACKGROUND

The present disclosure relates to a dock leveler, and, more particularly, to a lip for the dock leveler and an installation method of the dock leveler.

Loading dock levelers are commonly used for providing an inclined ramp, or a level bridge, between the surface of a transport truck deck and a floor surface of a loading dock of a building, thereby facilitating the loading and unloading of the truck by wheeled vehicles, as well as allowing for ambulatory movement, such as pedestrian or animal traffic, if necessary.

Transport trucks have load carrying decks that vary in height above the pavement depending on the size of truck, the intended use of the truck, and the state of compression that the truck suspension is in when loaded or unloaded. Since any truck arriving at a dock may have a deck within a range of heights and the height can float with the suspension under loading, the loading dock leveler must be able to move vertically. The outside end often pivots from a fixed pivot point on the building to rest on the top surface of the truck deck.

The movable deck of the dock leveler usually has a deck plate that pivots from the building, and an outside lip plate that is thin and of relatively short length. The lip plate pivots on the outside end of the deck plate to provide a smooth transition between the truck deck surface and the deck plate. The main deck is a larger, thicker structure that provides a long ramp or bridge section to accommodate most of the difference in heights between the truck deck and building floor, while the lip plate can be a relatively thin plate that rests upon the truck deck and provides a short ramp transitioning between the truck deck and the dock leveler deck plate platform.

SUMMARY

According to one embodiment of the present disclosure, a dock leveler is provided that has a frame with a deck plate rotationally coupled to the frame. A lip plate defines a lip plate lower surface and an edge. A lip hinge is coupled to the lip plate and a connection plate to provide relative pivotal movement of the lip plate and the deck plate. The connection plate is positioned below the deck plate. A support link defines a guide slot and is slidably coupled with the connection plate via the guide slot. The lip tube is positioned about equidistant between the lip hinge and the edge on the lip plate lower surface.

According to another embodiment of the present disclosure, a dock leveler is provided that has a frame configured to support a dock leveler and at least one support leg that has a first tube operatively coupled to the support beam, and a second tube slidably disposed within the first tube such that the second tube is operable between a first position and a second position. The second tube defines a locking portion. A foot is positioned on an end of the second tube, and a shipping pin is configured to engage the locking portion of the second tube such that the second tube is held in one of the first or second positions.

According to yet another embodiment of the present disclosure, a method of installing a dock leveler is provided that includes the steps of providing a dock leveler with at least one support leg having a first tube within which a second tube is slidably disposed. The second tube is configured to accept a shipping pin which resists movement of the second tube relative to the first tube. The dock leveler is positioned within a pit defined by a loading dock and adjusts a height of the dock leveler within the pit such that a deck plate of the dock leveler is aligned with the loading dock. Next, removing the shipping pin from the second tube such that the second tube slides through the first tube and contacts a floor of the pit is performed. Welding the second tube to the first tube is then performed.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together, with the description, serve to explain principles and operation of the various embodiments.

BRIEF DESCRIPTION OF THE DRAWINGS

FIG. 7 is a cross-sectional view of an aspect of a support leg for the dock leveler illustrated in a first position;

FIG. 8 is a cross-sectional view of the support leg of FIG. 7, illustrated in the second position.

DETAILED DESCRIPTION

Figure 1:
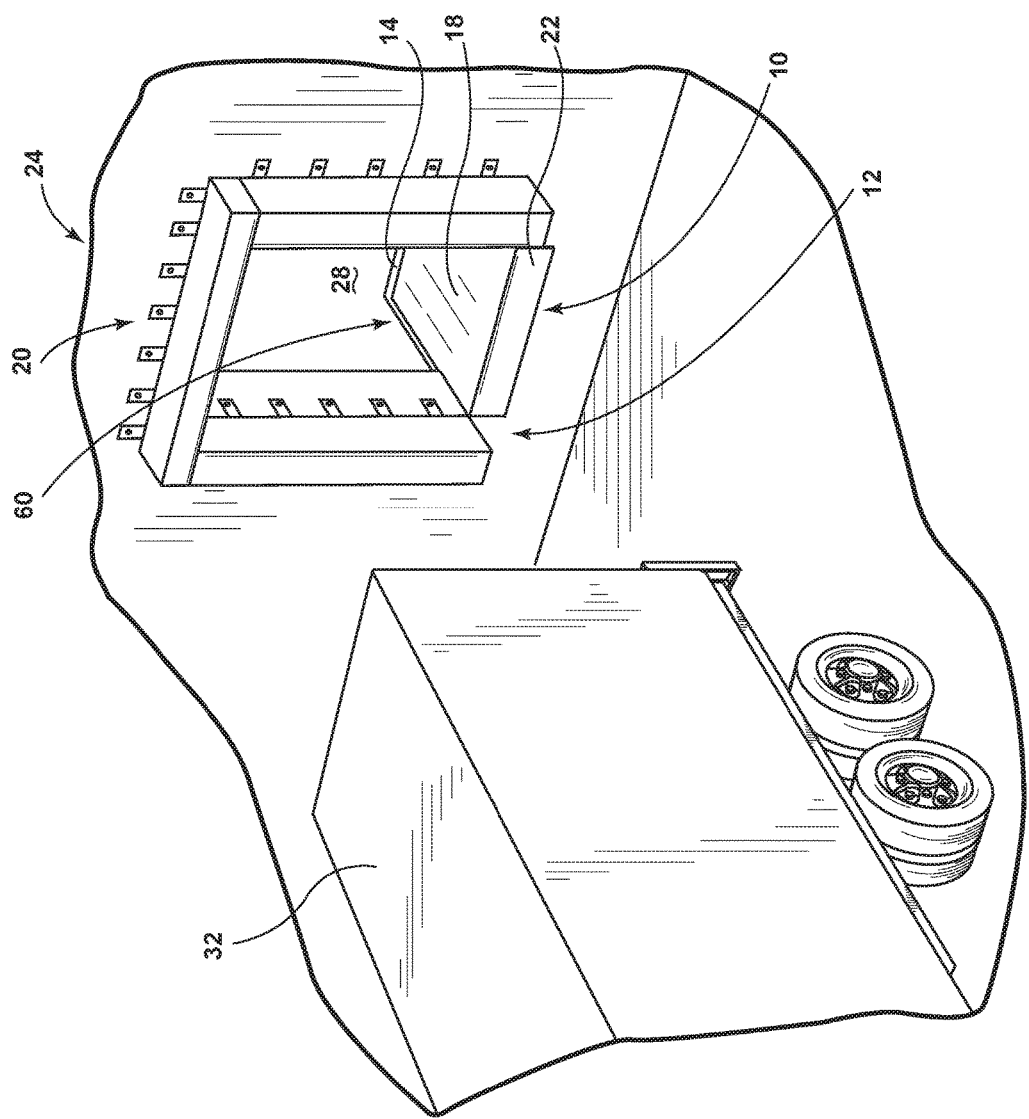
FIG. 1 is a perspective view of a loading dock incorporating a dock leveler having an aspect of the lip plate.

Reference will now be made in detail to the present preferred embodiments, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivatives thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-5, reference numeral 10 generally designates a dock leveler having a frame 14 and a deck plate 18 rotationally coupled to the frame 14. A lip plate 22 defines a lip plate lower surface 26 and an edge 30. A lip hinge 34 is coupled to the lip plate 22 and a connection plate 36 to allow relative pivotal movement of the lip plate 22 and the deck plate 18. The connection plate 36 is positioned below the deck plate 18. A support link 42 is slidably coupled with the connection plate 36 via a guide slot 38. The support link 42 is pivotally coupled with one or more lip tubes 46. Each support link 42 can be coupled to a pair of lip tubes 46. The lip tube 46 may be positioned about equidistant between the lip hinge 34 and the edge 30 on the lip plate lower surface 26.

Referring again to FIGS. 1-3, the dock leveler 10 may have a generally rectangular shape and is configured to fit within a pit 60 defined by a loading dock 12. The frame 14 is configured to support the dock leveler 10 within the pit 60. The pit 60 may be located proximate a truck loading doorway 20 in a building 24. The dock leveler 10 includes at least one support leg 64 which contacts a pit floor 68 and supports the dock leveler 10 within the pit 60. The deck plate 18 of the dock leveler 10 pivots at a rear of the dock leveler 10 and at about the same height as a dock floor 28 of the building 24 for receiving trailers 32.

Referring again to FIGS. 1-3, the deck plate 18 of the dock leveler 10 defines a transport surface 80 on which wheeled vehicles, people or animals travel. The deck plate 18 pivots in and out of the pit 60 relative to the floor 28 of the building 24 about a deck hinge 66. In various embodiments, the deck plate 18 is coupled to the frame 14 through the deck hinge 66. An actuator (not shown) is positioned below the deck plate 18 and is configured to lift and move the deck plate 18. The actuator may include inflatable air bags, hydraulic or pneumatic cylinders, mechanical linkages, cable hoist devices, electric motor driven screw actuators or other methods of providing motion to the deck plate 18. Disposed underneath the deck plate 18 are a plurality of the connection plates 36 which extend a length of the deck plate 18. The connection plates 36 may have various cross-sectional configurations, including, but not limited to, an "I," "U," "T," circular, rectangular or other similar cross section. Preferably, the connection plates 36 are included with a "T" shaped cross section. In various embodiments, the connection plate 36 having the "T" shaped cross section has been tested as having a good strength-to-weight ratio. In other words, the "T" shaped connection plate 36 decreases the overall weight of the dock leveler 10. This weight reduction has been shown to be approximately 200 to 300 lbs., or more, for a standard 7 foot wide by 8 foot long dock leveler 10. Along with the weight reduction, the use of the "T" shaped connection plate 36 provides sufficient structural support for the deck plate 18 as well as structure for operation of the one or more support links 42.

Figure 2:
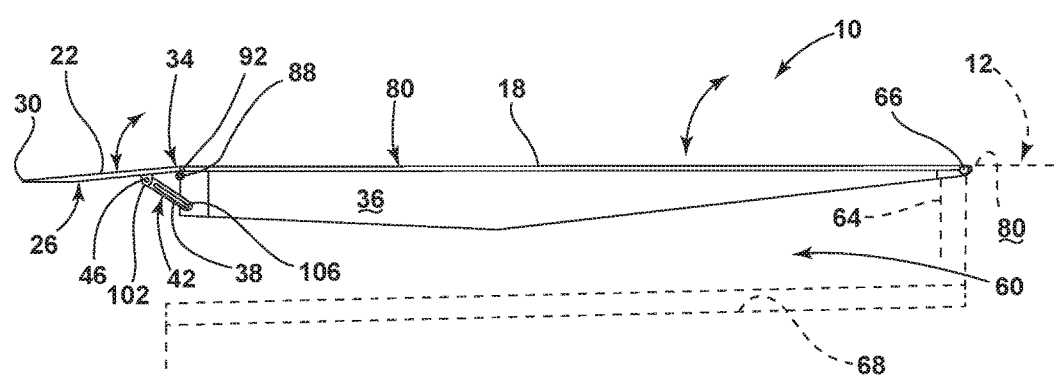
FIG. 2 is a side elevation view of an aspect of a dock leveler incorporating the lip plate.
Figure 3:
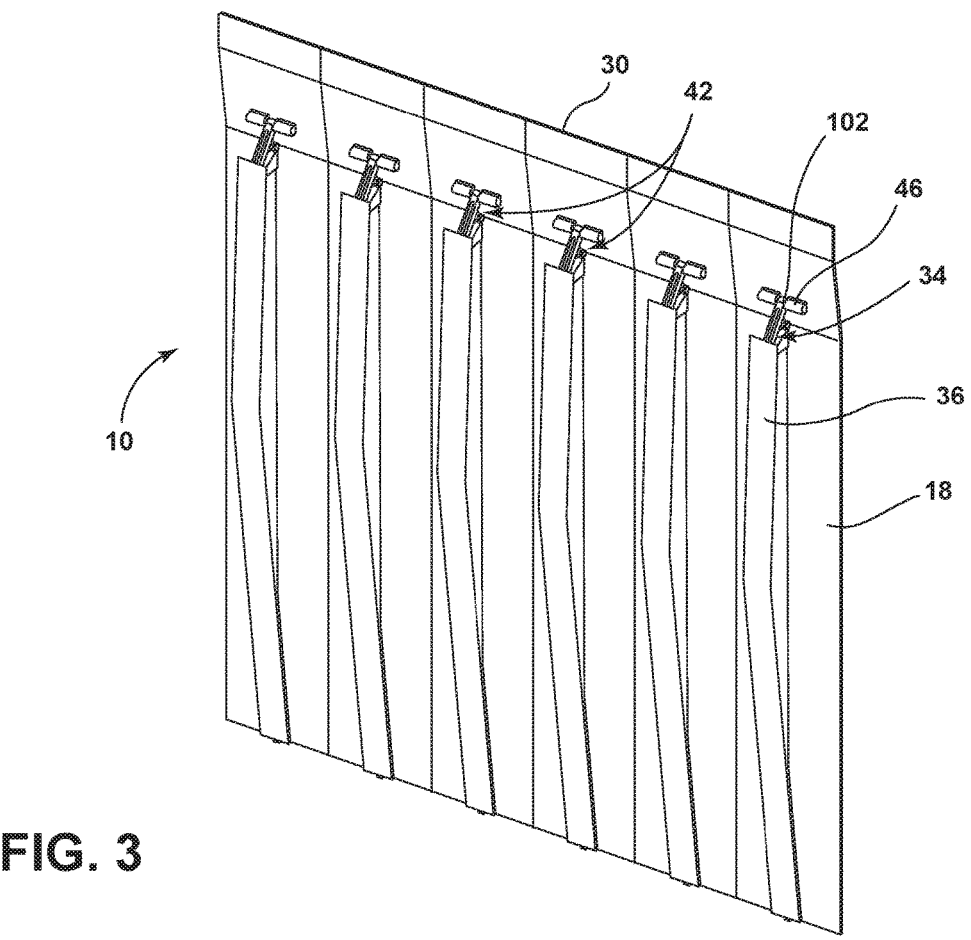
FIG. 3 is a bottom perspective view of an aspect of the dock leveler of FIG. 2.

According to various embodiments, as exemplified in FIGS. 2 and 3, the connection plates 36 may increase and/or decrease in size over the length of the deck plate 18 in order to provide even support across the entire deck plate 18. By way of example, and not limitation, portions of the deck plate 18 farther from the deck hinge 66, may require additional structural support from the connection plates 36 so that the connection plates 36 may have a greater first cross-sectional area or size at these distal locations proximate the lip hinge 34. Conversely, portions of the deck plate 18 nearer the deck hinge 66 may require less structural support and, in turn, connection plates 36 having a smaller second cross-sectional area or size. It is also contemplated that the connection plates 36 can remain substantially consistent along the length of the deck plate 18. The difference in size or cross-sectional area of the connection plates 36 can be accounted for by the web 108 having a first height proximate the lip hinge 34 and a smaller second height proximate the deck hinge 66. The size of the flange 110 of the connection plate 36 can also vary.

In various embodiments, the connection plates 36 may extend from about the deck hinge 66 to the lip plate 22. The lip plate 22 is coupled to the deck plate 18 through a plurality of the lip hinges 34. Each lip hinge 34 is coupled with the lip plate 22 and at least one of the connection plates 36. The lip hinges 34 are positioned on a side of the connection plates 36 opposite that of the deck hinge 66. The lip hinges 34 include one or more hinge tubes 88 through which a hinge pin 92 is disposed. The construction of the hinge pin 92 within the hinge tube 88 allows pivotal rotation of the lip plate 22 with respect to the deck plate 18. The lip plate 22 may be relatively thin and of relatively short length in comparison to the deck plate 18. The lip plate 22 defines the edge 30 on an opposite side of the lip plate 22 from the lip hinges 34. When adjusted, the lip plate 22 provides a smooth transition between the truck deck surface of a trailer 32 and the deck plate 18. The lip hinge 34 can also include a single continuous hinge extending across substantially all of the lip plate 22.

Referring again to FIGS. 2-4, the lip tube 46 is positioned on the lower surface 26 of the lip plate 22. The lip tube 46 may be positioned at about a middle of the lip plate 22, or about equidistant between the edge 30 and the lip hinge 34. It will be understood that the lip tube 46 may be positioned on the lip plate lower surface 26 merely proximate (e.g., with up to about 30% difference from the true middle) the middle of the lip plate 22 without departing from the spirit of the disclosure. The lip plate 22 may have a plurality of the lip tubes 46 disposed along the lip plate lower surface 26 (e.g., proximate each of the connection plates 36) or a single lip tube 46. Connected to the lip tubes 46 may be a pair of the support links 42. It will be understood that a single support link 42, or more than two support links 42, may be connected to the lip tube(s) 46. A lip pin 102 passes through the support links 42 and the lip tubes 46 such that the support links 42 and the lip plate 22 may pivot and be rotationally operable relative to one another via the lip tube 46. Coupled to an opposite side of the support links 42 than the lip tube 46 is a connection pin 106. The connection pin 106 passes through each of the guide slots 38 defined by the one or more support links 42 and connection plate 36 thereby slidably connecting the support links 42 to the connection plates 36. As the lip plate 22 is rotated, the support link 42 moves and is guided along the connection pin 106 by the guide slot 38.

According to the various embodiments, movement of the components of the lip plate 22 and support link 42 can be manual, or can be assisted by various powered mechanisms that can include pneumatic mechanisms, hydraulic mechanisms, motors, tensioning mechanisms, biasing mechanisms, spring-loaded mechanisms, combinations thereof and other similar powered mechanisms for assisting the rotation of the lip plate 22.

Figure 4:
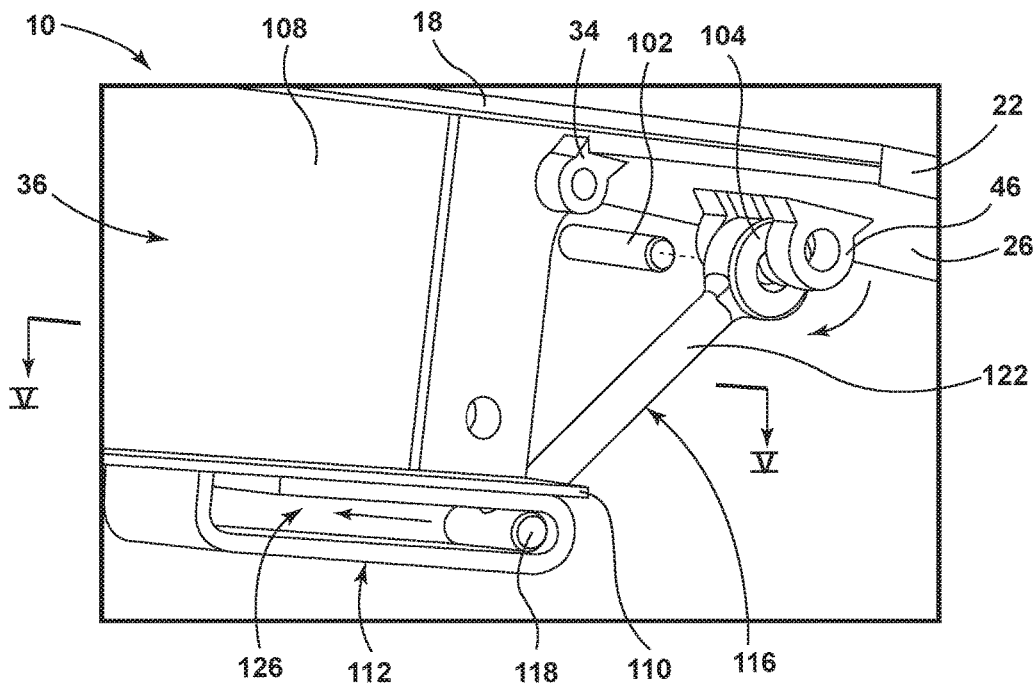
FIG. 4 is a partially-exploded side perspective view of an aspect of a support link for a dock leveler.
Figure 5:
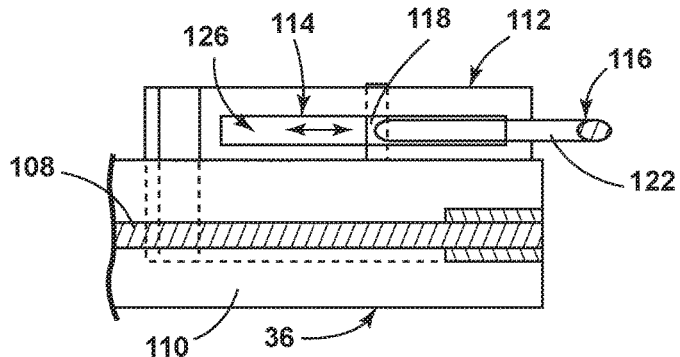
FIG. 5 is a cross-sectional view of the support link of FIG. 5 taken along line V-V.
Figure 6:
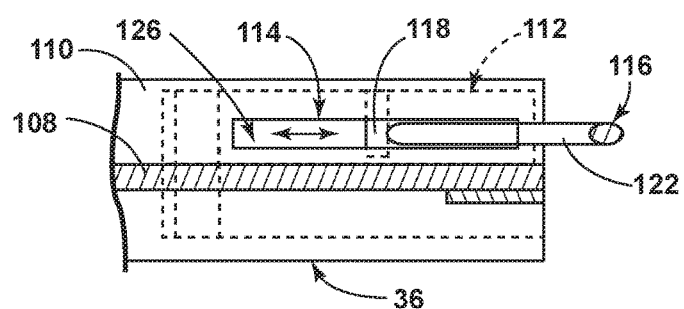
FIG. 6 is a cross-sectional view of an alternate aspect of a support link for a dock leveler.

Referring now to FIGS. 4-6, the support link 42 for the dock leveler 10 can include a T-bolt 116 that extends from a lower surface 26 of the lip plate 22 and extends downward toward one of the connection plates 36. As discussed above, a preferred embodiment of the connection plate 36 can be a T-section member where the web 108 extends downward from the deck plate 18, and the flange 110 of the T-connection plate 36 is disposed at the base of the web 108 and parallel with the deck plate 18. A link receiver 112 can be disposed on an underside of the flange 110 and can include a link slot 114 defined within a top portion of the link receiver 112. In such an embodiment, the T-bolt 116 having an eyelet 104 extends from the lip tube 46 on the underside or lower surface 26 of the lip plate 22, where the T-bolt 116 is attached to the lip plate 22 via the lip pin 102, extending through the eyelet 104 and the lip tube 46. The T-bolt 116 extends downward and through the link slot 114 of the link receiver 112. In this manner, the T-bolt 116 includes a head portion 118 that is received within and slidably retained within an interior portion 126 of the link receiver 112. The head portion 118 is wider than the link slot 114 in a perpendicular orientation. The head portion 118 is narrower than the link slot 114 in a parallel orientation (not shown) for installation purposes. The shaft 122 of the T-bolt 116 is allowed to slide through the link slot 114 such that the head portion 118 of the T-bolt 116 can slide through the interior portion of the link receiver 112. As the head portion 118 slidably operates through the link receiver 112, the lip plate 22 operates between a plurality of rotational positions, such as an uppermost position and a lowermost position, depending upon the needs of the user.

Referring again to FIGS. 4-6, it is contemplated that the link receiver 112 can be attached to the flange 110 of the connection plate 36 such that the link slot 114 of the link receiver 112 is positioned adjacent to the flange 110 of the T-shaped connection plate 36. In this manner, the flange 110 of the T-shaped connection plate 36 can remain substantially intact so as to not diminish the structural integrity of the flange 110 of the connection plate 36.

Referring now to FIG. 7, it is contemplated that in various embodiments, the link receiver 112 can be positioned under the flange 110 of the T-shaped connection plate 36. In such an embodiment, the flange 110 can include or define a portion of the link slot 114, such that the shaft 122 of the T-bolt 116 extends through both the flange 110 and the link receiver 112, where the head portion 118 of the T-bolt 116 is received within the link receiver 112.

In various alternate embodiments, it is contemplated that the link slot 114 can be defined within only the flange 110, where the flange 110 serves to define the link slot 114 through which the shaft 122 of the T-bolt 116 extends. In such an embodiment, the head portion 118 slidably engages the underside or lower surface 26 of the flange 110 of the T-shaped connection plate 36.

Referring again to FIGS. 4-6, according to various embodiments, it is contemplated that the link receiver 112 can be made of metal, plastic, composite, polymers, combinations thereof, and other similar materials that have the structural integrity to support the movement of the head portion 118 of the T-bolt 116 through the link slot 114 and the interior portion 126 of the link receiver 112. It is contemplated that the link receiver 112 can be a plate member that is shaped to form the interior portion 126 of the link receiver 112. In this manner, the bent portion of the link receiver 112 is folded over on itself to define the interior portion 126. Accordingly, the interior portion 126 limits the movement of the head portion 118 of the T-bolt 116 in a lateral direction substantially parallel with the flange 110 of the T-shaped connection plate 36. Through this limitation of movement, it is contemplated that the T-bolt 116 can move smoothly and efficiently between the plurality of positions to define the plurality of rotational positions of the lip plate 22. In alternate embodiments, the link receiver 112 can also be positioned on a top surface of the flange 110, rather than below the flange 110.

In order to provide efficient movement of the head portion 118 of the T-bolt 116, the interior portion 126 of the link receiver 112 can include various sliding assemblies that create a low friction interface between the head portion 118 of the T-bolt 116 and the interior portion 126 of the link receiver 112. Such friction limiting mechanisms can include, but are not limited to, lubricants, bearings, rollers defined within the head portion 118, combinations thereof, and other similar friction-limiting mechanisms.

Referring now to FIGS. 7 and 8, depicted are the support legs 64 of the dock leveler 10 coupled to the frame 14. Each support leg 64 includes a first tube 120 and a second tube 124. The first and second tubes 120, 124 can be rectilinear, cylindrical, or some other similar shape. The first tube 120 is coupled (e.g., welded, joined, defined by, etc.) to the frame 14 and is set below the frame 14 and the transport surface 80 to define a welding channel within which the first tube 120 can be welded to the second tube 124 (as exemplified in FIG. 8). The second tube 124 is slidably disposed within the first tube 120 such that the second tube 124 may extend from and retract within the first tube 120. The second tube 124 may include a foot 128 positioned on a bottom end of the second tube 124. The foot 128 is configured to contact a substrate, positioned below the dock leveler 10, such as the pit floor 68. The second tube 124 may be longer than the first tube 120 such that a portion of the second tube 124 protrudes from a top of the first tube 120 when the foot 128 is in contact with the first tube 120. The second tube 124 defines a locking portion 132 positioned on the protruding portion. The locking portion 132 is configured to engage with a shipping pin 136. The locking portion 132 and the shipping pin 136 are configured to mate and/or cooperate to keep the second tube 124 retracted within the first tube 120 until the shipping pin 136 is removed. The locking portion 132 may be a hole through one or both sides of the second tube 124, a groove, notch, eyelet 104, or other geometry configured to accept the shipping pin 136. The shipping pin 136 may be a cotter pin, a clip pin, bolt, set screw, or other fastener configured to engage the locking portion 132 and resist the second tube 124 from sliding through the first tube 120. Selective removal of the shipping pin 136 from the locking portion 132 defines the slidable engagement of the second tube 124 within the first tube 12 from a first position to a second position. It is contemplated that the second position is different, and typically lower, than the first position. It will be understood that the locking portion 132 may additionally or alternatively be defined by the first tube 120 and that the shipping pin 136 may engage a portion of the first tube 120 without departing from the spirit of this disclosure.

Figure 9:
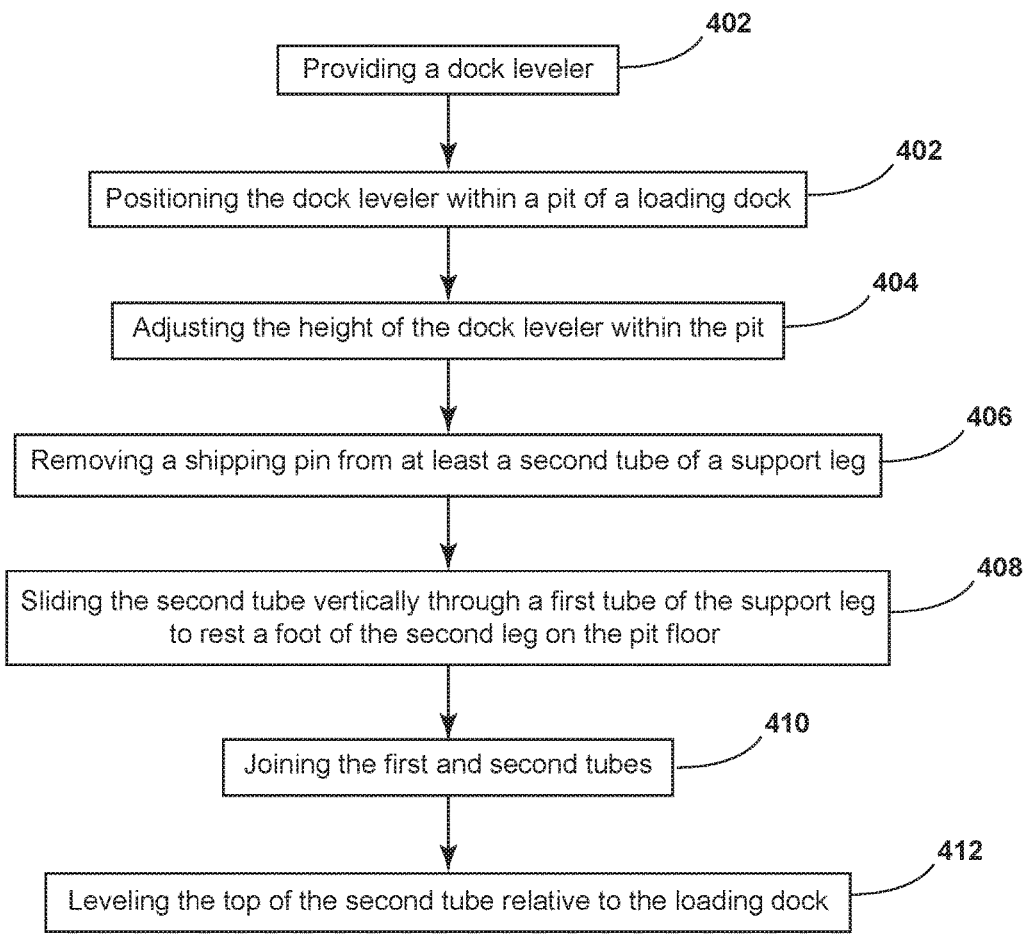
FIG. 9 is a schematic flow diagram illustrating a method for installing an aspect of the dock leveler into a pit of a loading dock.

Referring now to FIGS. 7-9, an exemplary method 400 of installing the dock leveler 10 into the pit 60 is described below. A first step of installing the dock leveler 10 within the pit 60 may include providing the dock leveler 10, as described above (step 402). Next, the dock leveler 10 may be positioned within the pit 60 defined by a loading dock 12 (step 404). Next, a step of adjusting a height of the dock leveler 10 within the pit 60, such that the deck plate 18 of the dock leveler 10 is aligned with the loading dock 12, is performed (step 406). The height of the dock leveler 10 may be adjusted within the pit 60 by placing one or more jacks (e.g., screw jacks, scissor jack, bottle jack, farm jack, etc.) under the frame 14 of the dock leveler 10, lifting the dock leveler 10 with a forklift or other method of lifting the dock leveler 10. The deck plate 18 may be aligned with the loading dock 12 when the entire deck plate 18, or at least the portion of the dock leveler 10 proximate the deck hinge 66, is planar with the loading dock 12, when the deck hinge 66 is at a proper height, or when the dock leveler 10 reaches a predetermined position. Next, a step of removing the shipping pin 136 from the second tube 124 (step 408), such that the second tube 124 slides through the first tube 120 and contacts the pit floor 68 (step 410), is performed. The second tube 124 may descend through the first tube 120 toward the pit floor 68 via gravity, be pushed through the first tube 120 or be pulled through the first tube 120 (e.g., via human or mechanical force). Next, a step of joining the first and second tubes 120, 124 together may be performed. Joining of the first and second tubes 120, 124 (step 412) may be accomplished through a rigid attachment such as welding and/or mechanical forms of deformation. The first and second tubes 120, 124 may be joined at a top of the support legs 64, such as at the welding channel described above, or at a bottom of the support legs 64 where the second tube 124 emerges from the first tube 120. By joining the first and second tubes 120, 124 together, the relative vertical motion between the first and second tubes 120, 124 is prevented, thereby locking the height of the dock leveler 10 within the pit 60 in place. In embodiments where the first and second tubes 120, 124 are bonded at a top of the support legs 64, the tops of the first and/or second tubes 120, 124, in addition to the surrounding deck plate 18, may be filled, ground, or otherwise leveled in order to ensure an even and level transport surface 80 within the area of the loading dock 12. It is contemplated that filling around the second tube 124 can take place where the top of the second tube 124 is below the transport surface 80. Conversely, grinding or other types of leveling are performed when the second tube 124 extends above the transport surface 80.

Use of the foregoing disclosure may offer several advantages to be realized when shipping and installing the disclosed dock leveler 10. First, use of the disclosed support legs 64 may ease shipping for the dock leveler 10. For example, the second tube 124 may be locked within the first tube 120 with use of the shipping pin 136 and the locking portion 132 during transport of the dock leveler 10. By locking the second tube 124 within the first tube 120, shipping space requirements for the dock leveler 10 may be reduced, which may result in less costly shipping. Second, use of the first and second tubes 120, 124 and the shipping pin 136 allow for easy setting and securing of the deck plate 18 height. By allowing the second tube 124 to descend through the first tube 120 to make contact with the pit floor 68 by only removing the shipping pin 136, labor traditionally associated with installation of dock levelers (e.g., positioning support legs 64, accounting for pit floor height variance, shimming the legs) may be reduced, resulting in a decrease in installation cost and labor time. Additionally, the convenient incorporation and use of the support lens 64 having the first and second tubes 120, 124 can serve to deter the use of shimming and/or jack mechanisms for supporting the dock leveler 10 after installation and during use.

While the embodiments disclosed herein have been set forth for the purpose of illustration, the foregoing description should not be deemed to be a limitation on the scope of the disclosure or the appended claims. It will be apparent to those skilled in the art that various modifications and variations can be made without departing from the spirit or scope of the claims.

It will be understood by one having ordinary skill in the art that construction of the described invention and other components is not limited to any specific material. Other exemplary embodiments of the invention disclosed herein may be formed from a wide variety of materials, unless described otherwise herein. In this specification and the amended claims, the singular forms "a," "an," and "the" include plural reference unless the context clearly dictates otherwise.

Where a range of values is provided, it is understood that each intervening value, to the tenth of the unit of the lower limit, unless the context clearly dictates otherwise between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It will be apparent to those skilled in the art that various modifications and variations can be made without departing from the spirit or scope of the claims.

What is claimed is:

1. A dock leveler comprising:
    a frame;
    a deck plate rotationally coupled to the frame at a deck hinge;
    a lip plate defining a lip plate lower surface and an edge;
    a lip hinge coupled to the lip plate and a connection plate to provide relative pivotal movement of the lip plate and the deck plate, the connection plate positioned below the deck plate; and
    a support link extending from the lip plate to the connection plate, the support link rotationally operable with respect to the lip plate and slidably operable with respect to the connection plate, wherein the support link remains entirely below the deck plate and is positioned between a flange of the connection plate and the deck plate, and wherein the support link slidably engages a connection pin that is coupled to a web of the connection plate.

2. The dock leveler of claim 1, wherein the support link includes a guide slot that slidably engages the connection pin attached to the connection plate.

3. The dock leveler of claim 2, wherein the support link slides relative to the connection pin between a flange of the connection plate and the deck plate, wherein the support link is maintained between the flange and the deck plate during operation of the lip plate.

4. The dock leveler of claim 1, wherein a lip tube is positioned approximately equidistant between the lip hinge and the edge on the lip plate lower surface, wherein the support link is rotationally operable relative to the lip plate via the lip tube.

5. The dock leveler of claim 2, wherein the support link includes a pair of support links that slidably operate adjacent to the connection plate, and wherein the connection pin extends through the connection plate and the pair of support links are at least partially separated by the web and slidably operate along the connection pin.

6. The dock leveler of claim 5, wherein the pair of support links each engage a connection pin that extends through a web of the connection plate.

7. The dock leveler of claim 1, wherein the connection plate has a first cross-sectional area proximate the lip hinge and a second cross-sectional area proximate the deck hinge, wherein the first cross-sectional area is greater than the second cross-sectional area.

8. The dock leveler of claim 7, wherein the connection plate includes a web that has a first height proximate the lip hinge and a second height proximate the deck hinge, wherein the first height is greater than the second height.

9. The dock leveler of claim 4, wherein the support link is coupled to a pair of lip tubes that engage an eyelet of each support link.

10. The dock leveler of claim 6, wherein slidable operation of the guide slot with respect to the connection pin defines a plurality of rotational positions of the lip plate relative to the deck plate.

11. The dock leveler of claim 1, wherein the deck plate includes a plurality of connection plates and a corresponding plurality of support links, and wherein each connection plate is coupled to a respective support link of the corresponding plurality of support links that extends to the lip plate.

12. A dock leveler comprising:
a frame;
a deck plate rotationally coupled to the frame at a deck hinge;
a lip plate coupled to the deck plate at a lip hinge;
a plurality of connection plates coupled to an underside of the deck plate; and
a plurality of support links that are rotationally coupled to the lip plate; wherein:
each support link of the plurality of support links slidably engages a respective connection plate of the plurality of connection plates;
each support link includes a guide slot that slidably engages a corresponding connection pin attached to a respective connection plate; and
rotational operation of the lip plate corresponds to rotational operation of the plurality of support links with respect to the lip plate and further corresponds to slidable operation of the plurality of support links with respect to the plurality of connection plates.

13. The dock leveler of claim 12, wherein each connection plate of the plurality of connection plates includes a T-shaped cross section having a web and a flange, wherein each support link of the plurality of support links is slidably operable along the flange of the respective connection plate.

14. The dock leveler of claim 12, wherein each connection plate of the plurality of connection plates includes a T-shaped cross section having a web and a flange, wherein each support link of the plurality of support links is slidably operable along the web of the respective connection plate.

15. The dock leveler of claim 14, wherein each connection pin is attached to the web of the respective connection plate.

16. The dock leveler of claim 12, wherein each connection plate engages a pair of support links of the plurality of support links, wherein the plurality of support links operates between a flange of the connection plate and the deck plate.

17. A dock leveler comprising:
a deck plate rotationally coupled to a frame at a deck hinge;
a lip plate coupled to the deck plate at a lip hinge;
a connection plate attached to the deck plate; and
a pair of support links that are rotationally coupled to the lip plate and slidably engage the connection plate, wherein rotation of the lip plate corresponds to rotational operation of the pair of support links at an eyelet of the pair of support links and also corresponds to slidable operation of the pair of support links with respect to the connection plate, wherein each support link of the pair of support links includes a guide slot that slidably receives a connection pin attached to a web of the respective connection plate, and wherein the web of the respective connection plate is positioned between each support link of the pair of support links.

18. The dock leveler of claim 17, wherein the pair of support links slidably operates relative to the connection pin within an area between a flange of the connection plate and the deck plate.

19. The dock leveler of claim 18, wherein a lip tube is positioned on an underside of the lip plate and the eyelet of the support link engages the lip plate at the lip tube, wherein the lip tube is positioned approximately equidistant between the lip hinge and an edge of the lip plate, and wherein the support link is rotationally operable relative to the lip plate via the lip tube.

* * * * *